United States Patent Office 3,547,832
Patented Dec. 15, 1970

3,547,832
SHAPED REFRACTORY PARTS
Karl Hass, Niederkassel, and Georg Schinke and Ferd. Langenhoff, Ranzel, Germany, assignors to Dynamit Nobel Aktiengesellschaft, Troisdorf, Bezirk Cologne, Germany, a corporation of Germany
No Drawing. Continuation of application Ser. No. 540,146, Mar. 30, 1966. This application June 24, 1968, Ser. No. 754,143
Claims priority, application Germany, Apr. 2, 1965, D 46,949
Int. Cl. B01j 11/06; C04b 35/10
U.S. Cl. 252—455           7 Claims

ABSTRACT OF THE DISCLOSURE

Refractory shaped bodies useful, for example, as catalyst supports, are formed by firing a mixture of refractory oxide, hydroxide of aluminum, and metal alcoholates of the group silicon-aluminum alcoholate, aluminum-titanium alcoholate, and silicon-aluminum-titanium alcoholate.

---

This application is a continuation of application Ser. No. 540,146, filed Mar. 30, 1966, now abandoned.

The object of the present invention is a method of producing porous, clay-free highly refractory shaped parts which have high specific surfaces and high resistance to abrasion, characterized by forming refractory or highly refractory oxides with hydroxides of aluminum with the addition of anhydrolyzed mixtures of metal alcoholates or of condensed mixed metal alcoholates of the group of silicon-aluminum alcoholate, aluminum-titanium alcoholate, and silicon-aluminum-titanium alcoholate, and silicon-aluminum-titanium alcoholate in known manner into preforms, drying them and then firing at 150 to 1350° C., and preferably at 300 to 700° C.

The manufacture of shaped parts having a base of refractory oxides is generally carried out with the use of inorganic binders, such as bentonites, clays or kaolins, which can be used in untreated or acid-treated form. By mixing these binders, there can be produced shaped parts having graded physical and mechanical properties which find use in particular in the field of catalysts. In order to obtain a certain porosity, there are added to the compositions, before the shaping, so-called pore-foaming agents, among which use can be made of different compounds such as starch, phenol resin or carbon. In order to obtain good forming properties, lubricant and plasticizing agents, for instance higher fatty acids and their salts, polyvinyl alcohol and the like are added to the molding compositions. Without these binders, lubricants or plasticizers, compositions having a base of refractory oxides cannot be shaped into shaped parts of any desired form (spheres, rings, tube segments, etc.). In order to obtain sufficient strength of such shaped parts, the use of high firing temperatures is necessary. Since, however, the porosity and in particular the specific surface is generally decreased as a result of sintering when high firing temperatures are used, while on the other hand at low temperatures the strength of the shaped bodies is not sufficient, particularly in case of their use as catalyst supports, a method has been sought which, at relatively low firing temperatures, produces shaped bodies of high specific surface and at the same time good physical properties.

It has now been found that porous, clay-free, highly refractory shaped parts of high specific surface and high resistance to abrasion and good porosity can also be obtained if said shaped parts are produced by forming refractory or highly refractory oxides with hydroxides of aluminum, with the addition of anhydrolyzed mixtures of metal alcoholates or of condensed mixed metal alcoholates of the group silicon-aluminum alcoholate, aluminum-titanium alcoholate, and silicon-aluminum titanium alcoholate, in known manner into preforms, drying them and firing them at 150 to 1350° C., and preferably at 300 to 700° C.

By the method of the invention, it is in particular possible to enlarge the inner surface of the shaped parts on the one hand by reducing the firing temperature, and on the other hand by an increased addition of the hydroxides of aluminum; in this way, it becomes possible to adjust the resistance to abrasion, the weight per unit of volume and the surface of the shaped parts over a wide range.

By refractory or highly refractory oxides, within the meaning of the present invention, there are understood for instance the following oxides: corundum ($\alpha$-$Al_2O_3$), magnesium oxide (MgO), calcium oxide (CaO), beryllium oxide (BeO), zirconium oxide ($ZrO_2$), thorium oxide ($ThO_2$), spinel ($MgO \cdot Al_2O_3$), zirconium silicate ($ZrO_2 \cdot SiO_2$), the mixed oxides of magnesium, calcium, chromium and iron, the mixed oxide of "forsterite rocks" ($2MgO \cdot SiO_2$), as well as the mixed oxides of aluminum and silicon (for instance sillimanite: $Al_2O_3 \cdot SiO_2$, mullite: $3Al_2O_3 \cdot 2SiO_2$), zircon mullite, iron-aluminum spinel, iron-chromium spinel or their combinations produced by melting. For the production of porous shaped parts in accordance with the invention, there can be used both the refractory and highly refractory oxides of mineral origin and those of industrial origin.

By hydroxides of aluminum, there are understood both the orthohydroxide and the metahydroxide in their different crystalline modifications, for instance such as hydrargillite, bayerite, boehmite, as well as the aqueous forms of these hydroxides. The hydroxides can be used in quantities of 1 to 10,000 parts by weight to 100 parts by weight of refractory or highly refractory oxides, and preferably 10 to 250 parts by weight are used per 100 parts by weight of oxides.

The metal alcoholates can be of the formula $Me(OR)_x$ in which Me in the metal; R is a straight chain or branched aliphatic or cycloaliphatic, or fatty-aromatic group, and $x$ is the valence of the metal Me. The respective R's in a given alcoholate can be alike or different.

Condensed mixed metal alcoholates used in accordance with the invention can be produced as follows: Mixtures of alcoholates of the general formula set forth above are hydrolyzed by addition of a stoichiometric quantity of water. When using metal alcoholates of metals of aluminum and silicon, the addition of a metal alcoholate of titanium has proven favorable. In order to avoid excess concentrations, the water necessary for the hydrolysis can be added in an inert solvent also to the metal alcoholate mixtures. The metal alcoholate mixtures with addition of water or the condensed metal alcoholates can be used in quantities of 5 to 30 parts by weight, referred to 100 parts by weight of the sum of refractory oxides, and aluminum hydroxides, and preferably 10 to 15 parts by weight of metal alcoholate are used.

In order to carry out the method of the invention, there can be added a preformed condensed mixed metal alcoholate. In a second embodiment, the metal alcoholates can, however, also be prepared in the mixture of the refractory or highly refractory oxides and the hydroxides of aluminum.

The inner surface and the porosity of the shaped parts produced in accordance with the invention can, in a particularly advantageous embodiment, also be effected by an after treatment (see Example 4) with anhydrolyzed mixtures of metal alcoholates or with condensed metal alcoholates. This after treatment makes after-firing necessary, but this, however, can be effected even at relatively low firing temperatures, i.e., at a temperature which may be under the temperature which was employed in the manufacture of the shaped parts.

The shaped parts produced in accordance with the invention can be used as filter plates, as catalysts or catalyst supports, diaphragms, etc.

The firing time depends essentially both on the quantity of material used and on the composition. The type of furnace used for the firing can also have a positive or negative influence on the firing time.

The particular advantages of the method of the invention reside in the fact that the inner or specific surface and the porosity of the shaped parts can be controlled both by the heat treatment and by the composition of the starting material. Another advantage of the method of the invention is the use of relatively low firing temperatures which are possible due to the binders employed.

By the method of the invention, catalytically active materials, including metals or their oxides or other compounds of the transition elements, can also be introduced into the shaped parts without the mechanical properties (strength, porosity, etc.) being affected.

The porous shaped bodies produced in accordance with the invention can also be coated in known manner with catalytically active substances, for instance noble metal catalysts.

The manner of carrying out the method of the invention will be illustrated by the following examples:

EXAMPLE 1

A mixture consisting of 80 parts by weight of corundum of a particle size of less than 40$\mu$ and 20 parts by weight of alumina-hydrate (aluminum hydroxide) were wetted with an anhydrolyzed silicon-aluminum alcoholate by spraying. The percentage of alcoholate on the mass was 10% by weight.

The silicon-aluminum alcoholate used was prepared by prior hydrolysis of 1 mol of tetra-ethyl silicate and 1 mol of aluminum sec.-butylate (aluminum tri.-sec.-butylate) with 1 mol of water. The mixture, after having been moistened in this manner was shaped into balls of different diameter by a rotating movement by means of a suitable device and dried. Different batches of 100 kg. of the dried spheres were fired under the respective conditions set forth below. After the cooling of the shaped bodies, the properties were determined, said properties being set forth in the following table:

TABLE 1

| Firing temperature/firing time | 1,350° C./ 30 hrs. | 1,000° C./ 20 hrs. |
|---|---|---|
| Weight per unit of volume[1], g./cm.³ | 2.40 | 2.33 |
| Porosity, percent[1] | 38.0 | 38.0 |
| Abrasion 0.12 mm., in percent[1] | 2.1 | 2.5 |
| Specific surface, m.²/g.[1] | (²) | (²) |

[1] For the methods, see page 13.
[2] About 1.5.

EXAMPLE 2

30 parts by weight of fused corundum having a particle size of less than 20$\mu$ were sprayed with 70 parts by weight of alumina hydrate and with an anhydrolyzed alcoholate in accordance with Example 1 by means of a nozzle device. The mixture contains 13% of the said silicon aluminum alcoholate. Spheres were shaped by a rotating movement of this mixture. The spheres were dried. 100 kg. of these spheres were first of all heated slowly to 300° C. at such a rate of heating as to avoid a bursting of the spheres. Thereupon, firing of respective batches was effected at the following temperatures.

TABLE 2

| Firing temperature/firing time | 1,350° C., 30 hrs. | 1,000° C., 20 hrs. | 700° C., 15 hrs. | 500° C., 12 hrs. | 300° C., 6 hrs. | 200° C., 6 hrs. |
|---|---|---|---|---|---|---|
| Weight per unit of volume, g./cm.³ | 1.92 | 1.65 | 1.60 | 1.64 | 1.65 | |
| Porosity, percent | 50.4 | 53.5 | 55.0 | 53.3 | 54.4 | |
| Abrasion <0.12 mm., in percent | 0.2 | 0.1 | 1.7 | 2.1 | 1.5 | 1.3 |
| Specific surface, m.²/g. | 1.3 | 22.6 | 69.0 | 90.2 | 180 | 130 |

EXAMPLE 3

30 parts of corundum having a particle size of 10$\mu$ were mixed with 70 parts of alumina hydrate and 0.1 parts of nickel oxide (added as nickel carbonate). This mixture was sprayed with a silicon-aluminum-titanium alcoholate and shaped by a rotating motion into spheres. The percentage of binder in the total mass was 13%.

The silicon-aluminum-titanium alcoholate used was prepared from 1 mol of tetra-ethyl silicate. 1 mol of aluminum-sec.-butylate and 1 mol of tetra-(iso-propyl)-titanate, which was thereupon anhydrolyzed at room temperature with 3 mols of water.

After drying of the spheres, firing of respective batches was effected at the temperatures set forth below. The properties of the porous spheres are shown in the following table:

TABLE 3

| Firing temperature/firing time | 1,350° C., 30 hrs. | 1,000° C., 20 hrs. | 700° C., 15 hrs. |
|---|---|---|---|
| Weight per unit of volume, g./cm.³ | 1.77 | 1.65 | 1.68 |
| Porosity, percent | 53.7 | 53.5 | 52.4 |
| Abrasion <0.12 mm., in percent | 0.1 | 0.1 | 0.2 |
| Specific surface, m.²/g. | 1.5 | 20.5 | 75 |

EXAMPLE 4

1 kg. of spheres which were produced in accordance with Example 2 (firing temperature 1000° C.) were charged into a vessel which was then evacuated. The spheres were then impregnated with 500 ml. of a mixture which contained water-free gasoline and a silicon-aluminum alcoholate in accordance with Example 1 in a volumetric ratio of 1:1. After a sojourn time of about 20 minutes, the excess impregnating liquid (about 400 to 450 ml.) was removed and the spheres were heated slowly within the course of 2 hours to 500° C. and then, in an additional 2 hours, up to 800° C. The properties of the shaped bodies prepared in this manner are set forth in the following table:

TABLE 4

| Properties | Before the treatment | After the treatment |
|---|---|---|
| Weight per unit of volume, g./cm.³ | 1.65 | 1.69 |
| Porosity, percent | 53.5 | 52.3 |
| Abrasion 0.12 mm. in percent | 0.1 | 0.2 |
| Specific surface, m.²/g. | 22.6 | 34.1 |

EXAMPLE 5

1.2 kg. of porous shaped bodies which were prepared in accordance with Example 2 (firing temperature 700° C.) were charged after the predrying, i.e., before the firing, into a vessel, which was evacuated and then covered with 800 ml. of a mixture of vanadium oxytrichloride and water-free gasoline in a weight ratio of 1:1. After a period of action of 30 minutes, the excess (500 ml.) was removed by suction and the shaped bodies subjected to the action of moist air for 10 hours. The shaped bodies which had been treated in this manner were then fired for 2 hours at 500° C.

EXAMPLE 6

30 parts of magnesium oxide and 70 parts of alumina hydrate were wetted with 12 parts of an aluminum-titanium-silicon alcoholate, prepared in accordance with Example 3. By rotary movement, of the mixing plate and of the independently in counterflow driven rotor shaped bodies were obtained in the greater part in the form of spheres.

By firing, the shaped material was brought to the desired surface value.

At a firing temperature, for example, of 300° C. (term of firing 6 hrs.), there was obtained a specific surface of 170 to 200 m.$^2$/g.

EXAMPLE 7

20 parts of mullite and 80 parts of alumina hydrate were wetted with 14 parts of an aluminum-titanium alcoholate which was produced in a manner similar to Example 1.

By shaping, rings and compacts were obtained. They were compacted by firing at 400° C. (time of firing 8 hrs.). The specific surface of the shaped bodies was about 110 to 120 m.$^2$/g.

EXAMPLE 8

20 parts of sillimanite and 80 parts of alumina hydrate were wetted with 14 parts of an aluminum-titanium alcoholate which was prepared in the manner similar to Example 1.

By shaping this mixture, rings and compacts were obtained. They were solidified by firing at 400° C. (time of firing 8 hrs.). The specific surface of the shaped bodies was about 110 to 120 m.$^2$/g.

EXAMPLE 9

20 parts by weight of fused corundum of a particle size of less than 20$\mu$ with 80 parts by weight of alumina hydrate were treated in accordance with Example 2 with alcoholate and shaped. After the firing at 300° C. for 6 hours, the spheres had a specific surface of 220 to 240 m.$^2$/g.

EXAMPLE 10

10 parts by weight of fused corundum of a particle size of less than 20$\mu$, with 90 parts by weight of alumina hydrate were treated in accordance with Example 9 with alcoholate and were shaped and fired as in Example 9. The specific surface was 260 to 280 m.$^2$/g.

Thus, the invention provides a process for producing porous, refractory shaped parts of high specific surface and high resistance to abrasion, and which are free of clay binder. The invention involves forming a moldable mass including refractory oxide to serve as base for the refractory shaped part; hydroxide of aluminum for imparting uniformity of abrasion resistance and high specific surface throughout the shaped part; and metal alcoholates of the group silicon-aluminum alcoholate, aluminum-titanium alcoholate, and silicon-aluminum-titanium alcoholate. The mass is then molded, and the molded mass is fired at 150–1350° C., to form the refractory shaped part.

The use of alcoholates in production of refractory bodies has been described elsewhere. See copending application Ser. No. 324,583, filed Nov. 18, 1963, now abandoned. In the instant invention, the metal moiety of the alcoholate is of the 3rd and 4th Main Groups and the 4th Subsidiary Group, and, characteristically, hydroxide of aluminum is used. The organic moiety of the alcoholate can be as is disclosed elsewhere, for example in the said copending application.

The weight per unit of volume can be decreased by lowering of the firing temperature or by increasing the amount of the hydroxides of aluminum added. The weight per unit of volume as well depends on the type of refractory or highly refractory oxides used.

The weight per unit of volume and the porosity have been determined according to DIN 51065 (German Industrial Standards). While the specific surface has been measured by the so-called BET-method, a method known by a person skilled in the art. For the arbasion test the following procedure was applied:

100 g. of spheres, produced according to the present invention, were filled in a cylinder with a close spacing of inner fins. The cylinder was closed and rotated around its longitudinal axis for one hour. The amount of abrasion smaller than 0.12 mm. was measured.

What is claimed is:
1. Process of producing porous, refractory shaped parts of high specific surface and high resistance to abrasion, free of clay binder, which consists essentially of:
   (a) forming a moldable mass consisting essentially of:
      (1) refractory oxide to serve as base for the refractory shaped part;
      (2) hydroxide of aluminum for imparting uniformity of abrasion resistance, and high specific surface throughout the shaped parts;
      (3) anhydrolyzed metal alcoholates of the group consisting of silicon-aluminum alcoholate containing silicon and aluminum in equimolar amounts, aluminum-titanium alcoholate containing aluminum and titanium in equimolar amounts, and silicon-aluminum-titanium alcoholate containing silicon, aluminum, and titanium in equimolar amounts,
   (b) the amount of hydroxide of aluminum being 1 to 10,000 parts to 100 parts of refractory oxide, and the amount of metal alcoholate being 5–30 parts to 100 parts of the refractory oxide plus hydroxide of aluminum, on a weight basis;
   (c) molding said mass;
   (d) firing the molded mass at 150–1350° C.

2. Process according to claim 1, wherein said firing temperature is 300–700° C.

3. Process according to claim 1, wherein the metal alcoholates are anhydrolyzed in the refractory-shaped parts.

4. Process according to claim 1, wherein the amount of the metal alcoholate is 10–15 parts to 100 parts of the refractory oxide plus hydroxide of aluminum.

5. Process according to claim 1, wherein a catalytically active material is included in said shaped part.

6. Process according to claim 1, wherein a catalytically active material is deposited on the surface of the refractory shaped part.

7. Process according to claim 1, wherein the fired molded mass is impregnated with metal alcoholates as aforesaid and is again fired.

References Cited

UNITED STATES PATENTS 2,499,675    3/1950    Owen.

FOREIGN PATENTS 810,562    3/1959    Great Britain.
640,072    5/1964    Belgium _____ 106—57

JAMES E. POER, Primary Examiner

U.S. Cl. X.R.
106—55, 57, 58, 65, 69; 252—463